United States Patent [19]

Shibata

[11] 4,264,125
[45] Apr. 28, 1981

[54] TRANSMISSIVE SURFACE LAYER EFFECT ELECTRO-OPTIC DEVICE FOR USE IN OPTICAL MODULATORS AND THE LIKE

[75] Inventor: Yasuo Shibata, Tokyo, Japan
[73] Assignee: Xerox Corporation, Stamford, Conn.
[21] Appl. No.: 20,009
[22] Filed: Mar. 12, 1979

[30] Foreign Application Priority Data

Mar. 15, 1978 [JP] Japan ............... 53/28630

[51] Int. Cl.³ ............................................ G02B 5/14
[52] U.S. Cl. ................................................ 350/96.14
[58] Field of Search ............ 350/96.12, 96.13, 96.14, 350/355

[56] References Cited

U.S. PATENT DOCUMENTS

| | | | |
|---|---|---|---|
| 3,887,885 | 6/1975 | Hattori et al. | 350/96.14 |
| 3,944,812 | 3/1976 | Hattori et al. | 350/96.14 |

OTHER PUBLICATIONS

Gfeller, "LiNbO₃ Electro-Optic Modulator and Switch" in *Applied Physics Letters*, vol. 29, No. 10, Nov. 1976.

*Primary Examiner*—Stewart J. Levy
*Attorney, Agent, or Firm*—Thomas M. Webster

[57] ABSTRACT

An electro-optic device for use in optical modulating systems and the like comprises a pair of optically transparent, multi-element interdigital electrodes which are sandwiched between a pair of electro-optic crystals, whereby symmetrical fringing fields having a predetermined periodicity widthwise of the device are coupled into the crystals when a voltage is applied to the electrodes, thereby creating substantially identical phase diffraction gratings in the crystals for sequentially diffracting an incident optical beam.

6 Claims, 8 Drawing Figures

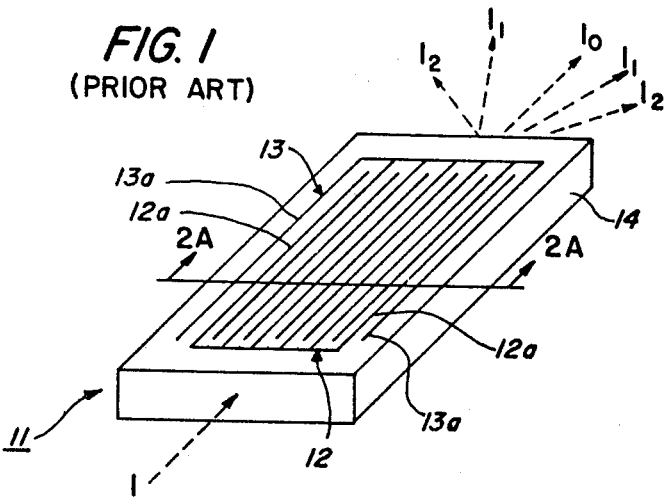
FIG. 1 (PRIOR ART)
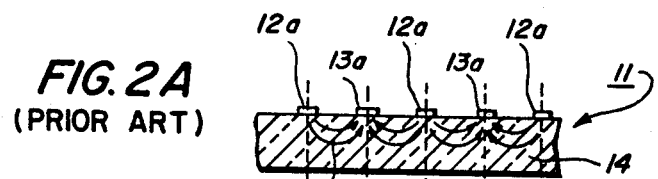
FIG. 2A (PRIOR ART)
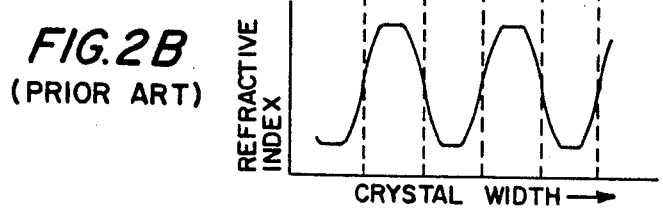
FIG. 2B (PRIOR ART)
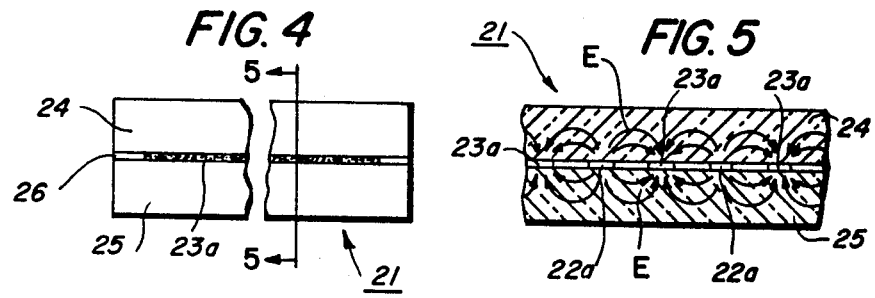
FIG. 4
FIG. 5

TRANSMISSIVE SURFACE LAYER EFFECT ELECTRO-OPTIC DEVICE FOR USE IN OPTICAL MODULATORS AND THE LIKE

BACKGROUND OF THE INVENTION

This invention relates to electro-optic (EO) devices and, more particularly, to optical modulators on such devices.

Others have recognized that the refractive index of an electro-optic crystal can be varied under the control of an applied electric field. There already are bulk and surface layer effect EO modulators which rely on that principle.

A bulk EO modulator typically comprises a pair of electrodes which are deposited on opposite sides of an electro-optic crystal. In operation, a time dependent modulating voltage is applied across the electrodes to establish a time varying electric field which extends through the crystal in a direction generally perpendicular to the optical axis of the crystal. Thus, when a polarized optical beam is launched into the crystal with its polarization at a predetermined angle relative to the electro-optic axes of the crystal, the beam is phase modulated by the applied field. If the E field of the beam is aligned with the electric or optic axis of the crystal, pure phase modulation is produced. If, however, the beam is launched into the crystal with its E field at an angle relative to the electro-optic axes of the crystal, the beam polarization is altered as a function of the length of the crystal and of the instantaneous intensity of the electric field. Accordingly, an intensity modulated light beam can be obtained by passing the output beam from the crystal through an appropriately polarized filter.

Bulk EO modulators suffer from the disadvantage that the effective intensity of the applied electric field is dependent not only on the amplitude of the modulating voltage, but also on the thickness of the crystal. Thin film bulk EO modulators have been proposed to solve the problem of obtaining a useful response to relatively low modulating voltage levels. Unfortunately, however, the utility of the thin film devices is limited because of the difficulties which are encountered in applying an optical beam thereto without experiencing excessive optical attenuation or unwanted mode conversion (i.e., alteration of the cross sectional shape of the beam).

Surface layer effect EO modulators are promising alternatives to bulk devices for many applications. These modulators usually comprise a pair of interdigital multi-element electrodes which are deposited on the so-called active surface of an electro-optic crystal. In operation, a time dependent modulating voltage is applied across the electrodes to create fringing fields between the adjacent electrode elements. The fringing fields extend into the crystal to a depth which is dependent on the instantaneous amplitude of the modulating voltage and have a periodicity widthwise of the crystal which is dependent on the spacing of the adjacent electrode elements. Hence, when an optical beam is launched into the crystal to interact with the periodic fringing fields, the beam is diffracted.

Heretofore, surface layer effect EO modulators have generally been configured to operate as total internal reflection ("TIR") devices because the amount of optical power which is coupled into each of the diffraction orders of the diffracted beam depends on the length of the effective area of interaction between the input beam and the fringing fields. Thus, the conventional practice has been to launch the input beam into the crystal at an angle selected to cause the beam to make grazing incidence with the active surface of the crystal. Nevertheless, even a TIR EO modulator is insensitive to low level modulating voltages because the input beam has a finite waist diameter in the diffraction limited case.

SUMMARY OF THE INVENTION

In accordance with this invention, a relatively efficient surface layer effect EO modulator is provided by sandwiching a pair of optically transparent, interdigital multi-element electrodes between a pair of electro-optic crystals so that symmetrical fringing electric fields having a predetermined periodicity widthwise of the modulator are coupled into the active surface layers of the crystals when a modulating voltage is applied across the electrodes. In operation, an optical beam is launched into one end of the modulator in a direction normal to the fringing fields and with a cone angle selected to cause the beam to sequentially interact with the fields in first one and then the other of the crystals, thereby providing a relatively long area of effective interaction between the beam and fields. Since the modulator is operated as a transmissive device, its sensitivity is substantially unaffected by the finite diameter of the waist of the input beam in the diffraction limited case. Moreover, the optical interference which inherently occurs in a TIR device between the incident and the reflected beams is avoided.

BRIEF DESCRIPTION OF THE DRAWINGS

Further objects and advantages of this invention will become apparent when the following detailed description is read in conjunction with the attached drawings, in which:

FIG. 1 is a perspective view of a conventional surface layer effect EO device;

FIG. 2A is a sectional view, taken along the line 2—2 in FIG. 1, to show the asymmetrical periodic fringing fields which are coupled into the electro-optic crystal of the EO device shown in FIG. 1 when a modulating voltage is applied across the electrodes;

FIG. 2B is a graph illustrating the effect of the fringing fields on the refractive index profile of the electro-optic crystal;

FIG. 4 is a fragmentary longitudinal elevational view of the EO device shown in FIG. 3;

FIG. 5 is a sectional view, taken along the line 5—5 in FIG. 4, to illustrate the symmetrical fringing fields which are coupled into the electro-optic crystal of the EO device shown in FIG. 3 when a modulating voltage is applied across the electrodes;

DETAILED DESCRIPTION OF THE ILLUSTRATED EMBODIMENT

Figure 3:
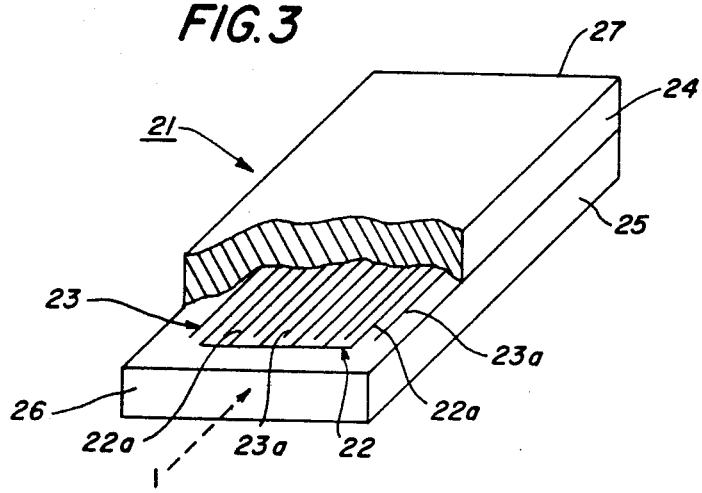
FIG. 3 is a partially cut-away prospective view of a surface layer effect EO device constructed in accordance with the present invention.

While the invention is described in substantial detail hereinbelow with specific reference to a particular embodiment, it is to be understood that there is no intent to limit it to that embodiment. On the contrary, the intent is to cover all modifications, alternatives and equivalents falling within the spirit and scope of the invention as defined by the appended claims.

Turning now to the drawings, and at this point especially to FIG. 1, there is a more or less conventional surface layer effect EO device 11 comprising a pair of comb shaped interdigital multi-element electrodes 12 and 13 which are deposited on the active surface of an electro-optic crystal 14. The individual elements 12a and 13a of the electrodes 12 and 13, respectively, extend lengthwise of the crystal 14 and alternate widthwise of the crystal 14.

In operation, a modulating voltage is applied across the electrodes 12 and 13, thereby generating fringing electric fields E between the adjacent electrode elements 12a and 13a. As shown in FIG. 2A, the fringing fields E have a periodicity widthwise of the crystal 14 which is dependent on the spacing of the electrode elements 12a and 13a. Moreover, the fringing fields E are coupled into the active surface of the crystal 14 to a depth dependent on the instantaneous field strength. Accordingly, as shown in FIG. 2B, the refractive index of the active surface layer of the crystal 14 periodically varies widthwise of the crystal 14 over a range which is dependent on the instantaneous amplitude of the modulating voltage.

As a result, when an optical beam, such as a laser beam I, is launched into one end of the crystal 14 in a direction normal to the fringing fields E and at an angle selected to cause the beam I to pass through the active surface layer of the crystal 14, the beam I is diffracted into its several diffraction orders $I_0, I_1, I_2 \ldots$. The optical power which is coupled into each of the diffraction orders $I_0, I_1, I_2 \ldots$ depends on the length of the effective area of interaction between the beam I and the fields E and on the instantaneous intensity of the fields E. For that reason, the EO devide 11 is customarily configured to operate as a TIR device so that there is relatively efficient coupling to the higher diffraction orders $I_1, I_2 \ldots$ in response to relatively low level modulating voltages.

Referring to FIG. 3, in accordance with the present invention, a relatively efficient EO device 21 is constructed by sandwiching a pair of optically transparent, comb shaped interdigital multi-element electrodes 22 and 23 between a pair of electro-optic crystals. The crystals are composed of a material, such as lithium niobate or lithium tantalate, and are selected to have substantially identical refractive indices under quiescent conditions. The individual electrode elements 22a and 23a are elongated to extend lengthwise of the crystals 24 and 25 in proximate contact with the active surfaces thereof and are spaced apart in alternating sequence widthwise of the crystals 24 and 25. Typically, the electrodes 22 and 23 are fabricated by photolithographically engraving metallic film-like electrode elements 22a and 23a on respective optically transparent conductive substrates, such as $In_2O_3$ or $SnO_2$ films. Desireably, the combined thickness of the electrodes 22 and 23 is less than one micron. Nevertheless, as shown in FIG. 4, there is a gap 26 between the crystals 24 and 25 due to the presence of the electrodes 22 and 23. Hence, the gap 26 is preferably charged with a medium having a refractive index selected to match the refractive indices of the crystals 24 and 25 under quiescent conditions. Furthermore, the input and output faces 26 and 27, respectively, of the EO device 21 ideally are polished or otherwise finished to be as flat as possible to avoid spurious sources of diffraction.

As shown in FIG. 5, when a modulating voltage is applied across the electrodes 22 and 23, symmetrical fringing electric fields E are generated between the adjacent electrode elements 22a and 23a, and the fringing fields E are coupled into the active surface layers of the crystals 24 and 25. The fringing fields E have a periodicity widthwise of the crystals 24 and 25 which is determined by the spacing of the adjacent electrode elements 22a and 23a and extend into the active surface layers of the crystals 24 and 25 to a depth determined by the instantaneous amplitude of the modulating voltage.

Figure 6:
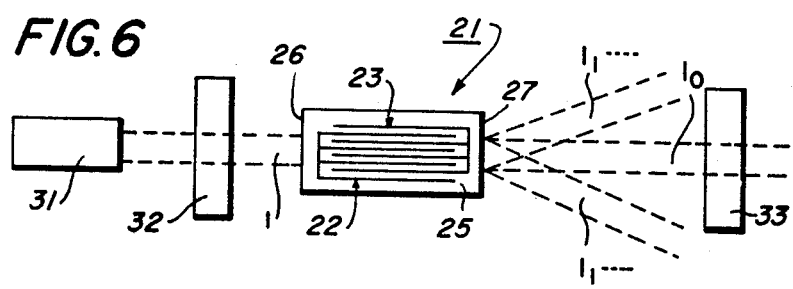
FIG. 6 is a plan view of an optical modulating system in which the EO device of this invention may be advantageously utilized (the upper electro-optic crystal of the EO device has been omitted for increased clarity)
Figure 7:
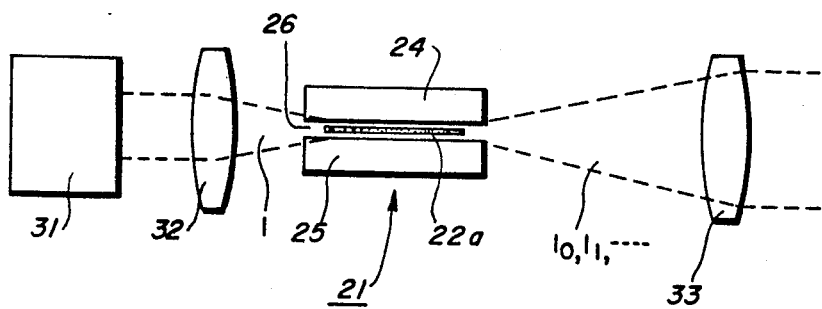
FIG. 7 is an elevational view of the optical modulating system shown in FIG. 6.

In operation, as shown in FIGS. 6 and 7, an optical beam I from, say, a laser 31 is applied to the EO device 21 through a cylinderical lens 32 which has power in a sagittal plane so that the beam I is brought to a wedge shaped focus with a predetermined cone angle at or near the electrodes 22 and 23 roughly half way along the length of the EO device 21. Therefore, most, if not all, of the rays of the focused light beam I, sequentially pass through the active surface layers of first one and then the other of the crystals 24 and 25 to sequentially interact with the fringing fields E first on one side and then on the other side of the electrodes 22 and 23. Since the fringing fields E periodically alter the refraction indices of the crystals 24 and 25 widthwise of the EO device 21, substantially identical phase diffraction gratings are created in the active surface layers of both of the crystals 24 and 25. Thus, the input beam is diffracted into its several diffraction orders $I_0, I_1, I_2 \ldots$ as it sequentially passes through the active surface layers of the crystals 24 and 25. In keeping with conventional practices, a cylinder lens 33 having power in the sagittal plane (i.e., to complement the input lens 31) may be aligned with the output of the EO device 21 to separate one of the diffraction orders, say the zero order $I_0$, from the other or higher orders $I_1, I_2 \ldots$. As will be appreciated, the zero order $I_0$ of the diffracted output beam will be intensity modulated in accordance with the modulating voltage because the amount of optical power coupled into the higher diffraction orders $I_1, I_2 \ldots$ directly depends on the instantaneous amplitude of the modulating voltage.

CONCLUSION

In view of the foregoing, it will now be understood that this invention provides a relatively effficient EO device for use in optical modulating systems and the like. A minor portion of the input light beam I may avoid the modulating effects of the fringing fields E due to the gap 26 between the crystals 24 and 25, but that is a negligible factor if the width of the gap 26 is selected to be smaller than the diameter of the waist of the light beam I at focus. Moreover, it is outweighed by the relative ease with which the effective area of interaction between the input beam and the fringing fields E is lengthened in accordance with this invention.

What is claimed is:

1. A transmissive surface layer effect electro-optic device comprising
   a pair of electro-optic crystals;
   a pair of interdigital multi-element electrodes sandwiched between said crystals, said electrodes having elements extending lengthwise of said crystals, with the elements of said electrodes being spaced apart in alternating sequence widthwise of said crystals, whereby substantially symmetrical fringing electric fields having a predetermined periodicity widthwise of said crystals are coupled into said crystals when a voltage is applied to said electrodes;

means for applying an optical beam to one end of said device with a cone angle selected to cause said beam to sequentially interact with the fringing fields coupled into said crystals, whereby said beam is diffracted into several diffraction orders; and means aligned with the opposite end of said device to separate a predetermined one of said diffraction orders from the others, whereby an output beam which is intensity modulated in accordance with said voltage is recovered.

2. The surface layer effect electro-optic device of claim 1 wherein said crystals have substantially identical refractive indices under quiescent conditions;

said electrodes are disposed in a gap between said crystals; and said gap is charged with a medium having a refractive index selected to substantially match the refractive indices of said crystals under quiescent conditions.

3. The surface layer effect electro-optic device of claim 1 wherein each of said electrodes comprises a comb shaped set of mettalic elements deposited on an optically transparent conductive substrate.

4. The surface layer effect electro-optic device of claim 1 wherein said electrodes are disposed in a gap between said crystals;

each of said electrodes comprises a plurality of elongated metallic elements deposited on an optically transparent conductive film-like substrate; and said means for applying said optical beam to said device comprises a cylinder lens having power in a sagittal plane, whereby said optical beam is brought to a wedge shaped focus substantially at said electrodes.

5. The surface layer effect electro-optic device of claim 4 wherein said optical beam has a predetermined waist diameter at said focus; and said gap is narrower than said waist diameter, whereby substantially all rays of said optical beam sequentially pass through said crystals.

6. The surface layer effect electro-optic device of claim 5 wherein said crystals have substantially identical refractive indices under quiescent conditions; and said gap is charged with a medium having a refractive index selected to match the refractive indices of said crystals under quiescent conditions.

* * * * *